Oct. 15, 1968   A. T. CHARLTON   3,405,419
WINDSCREEN WIPERS
Filed Dec. 20, 1965
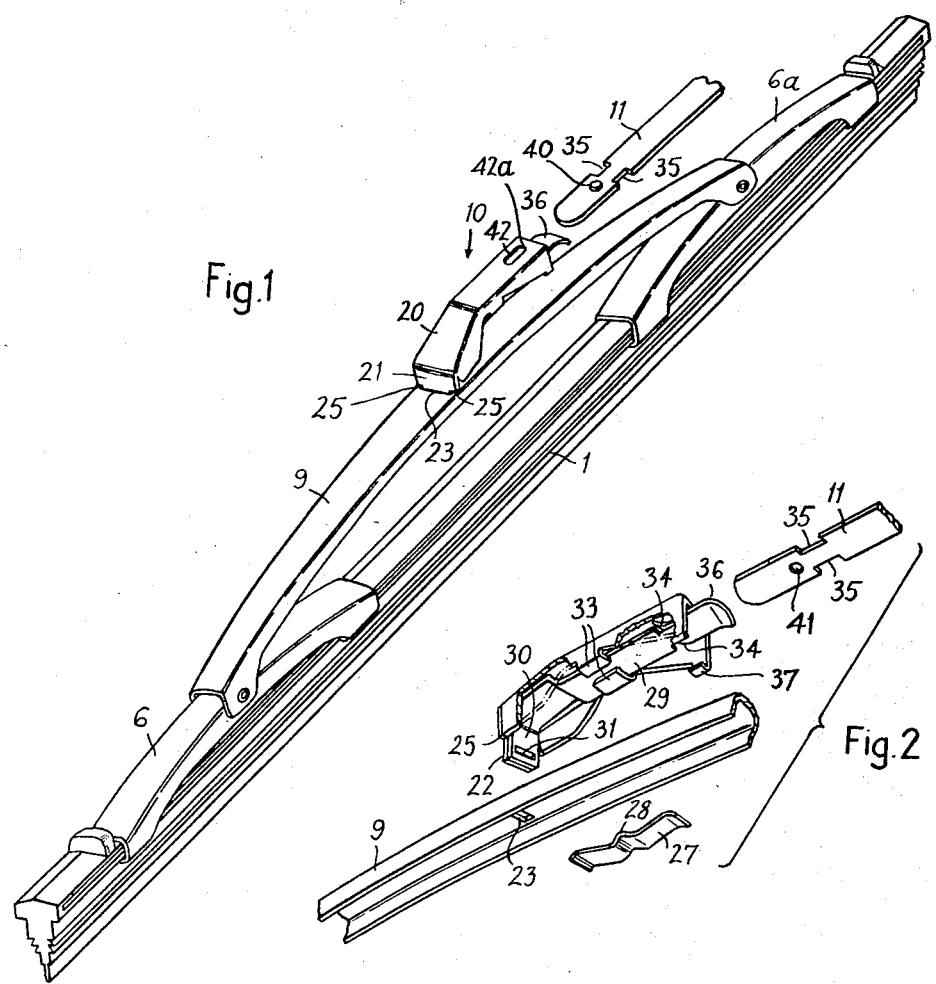
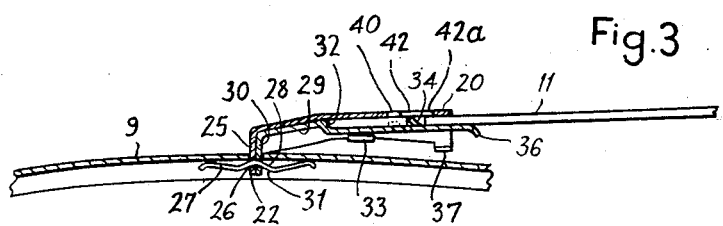
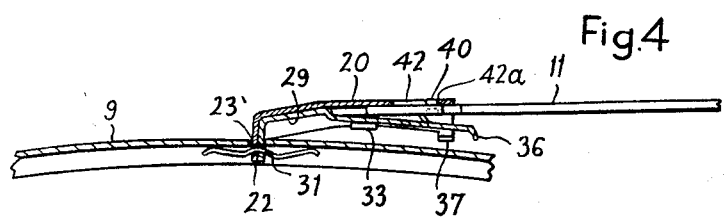
Inventor
A. T. CHARLTON
By
Holcombe, Wetherill-Brisebois
Attorneys 000# United States Patent Office 3,405,419
Patented Oct. 15, 1968

3,405,419
WINDSCREEN WIPERS
Arthur T. Charlton, Osterley, Middlesex, England, assignor to Magnatex Limited, Harlington, Middlesex, England, a British company
Filed Dec. 20, 1965, Ser. No. 515,130
Claims priority, application Great Britain, Dec. 24, 1964, 52,509/64
2 Claims. (Cl. 15—250.32)

ABSTRACT OF THE DISCLOSURE

The invention relates to means for connecting a windscreen wiper blade to its operating wiper arm. The end of the arm, which is of rectangular strip form, is provided with notches at its edges and a projecting dimple on its top surface, adapted to interengage respectively with detents struck up from a leaf spring in the connector housing and an aperture in the top wall of the connector housing into which the dimple is urged by the leaf spring. The aperture is in the form of a closed slot.

---

The present invention relates to windscreen wipers, and more particularly to connector means for connecting a windscreen wiper arm to a wiper blade having a pressure-distributing backing, of the kind in which the outer end of the wiper arm comprises a flat substantially rectangular-section strip portion which slides longitudinally into a correspondingly shaped passage in a connector on the blade backing, and is retained therein by a leaf spring in the connector holding shoulders on the arm and connector in engagement.

Windscreen wipers are known having connector means of the above kind in which the outer end of the wiper arm is provided with notches at opposite side edges thereof, which are adapted to be engaged by detents struck up at the sides of a leaf spring incorporated in the connector on the blade.

From one aspect, the invention consists in a windscreen wiper having connector means of the kind referred to, in which the outer end of the wiper arm is provided with a notch at one or both side edges thereof, said notch or notches being adapted to be engaged by a detent or detents struck up at one or both sides of a leaf spring incorporated in the connector, and in which the outer end of the arm is also provided with a projection on one surface thereof which is adapted to enter an aperture in the wall of the connector opposite the spring when the said detent or detents engage the notch or notches and is urged into said aperture by the spring.

The connector means according to this invention provides two separate sets of co-operating shoulders for retaining the arm in the connector, said sets respectively requiring different movements for disengagement, namely flexing of the spring to disengage the detents from the notches and moving the arm end away from the opposing wall to disengage the projection from the aperture.

Preferably the two sets of co-operating shoulders are so located that when the co-operating shoulders of one set are in engagement and resisting withdrawal of the arm, the co-operating shoulders of the other set will be spaced apart, thereby allowing limited withdrawal of the arm when the first set of shoulders are disengaged by one movement, whereafter the second set of shoulders can be disengaged by the second movement to permit complete withdrawal of the arm from the connector. This may be conveniently effected by forming the aperture which receives the projection as a closed slot extending in the longitudinal direction of the passage in the connector.

From a further aspect, the invention also consists in a windscreen wiper blade having a wiper arm connector pivotally attached to the blade backing so as to pivot about an axis transverse to the longitudinal direction of the blade, said connector having a passage extending generally in the longitudinal direction of the blade and having a cross-section adapted to receive the end of a wiper arm which is constituted by a flat strip portion of substantially rectangular cross-section, one wall of said passage being constituted by a leaf spring adapted to press against a flat face of the wiper arm end and having a detent struck up at one or both edges thereof, and the opposing wall of the passage having an aperture therein, preferably a closed slot extending in the longitudinal direction of the passage.

In order that the invention may be more clearly understood, reference will now be made to the accompanying drawing in which:

FIGURE 1 is a perspective view from above of a windscreen wiper blade provided with a connector according to this invention, and showing the end of the wiper arm.

FIGURE 2 is an exploded perspective view from below of part of the bridge piece and the connector and arm end shown in FIGURE 1, the connector being partly cut away.

FIGURE 3 is a scrap section through the connector, with the arm end inserted therein.

FIGURE 4 is a section similar to FIGURE 3 but with the arm end partially withdrawn from the connector.

Referring to the drawings, the windscreen wiper blade shown comprises a squeegee element 1 provided with means for permitting it to flex to conform with the curvature of the windscreen whilst restraining transverse flexing, the squeegee element being mounted in a pressure distributing backing comprising yoke members 6, 6a, intermediate points on which are hingedly connected to a bridge piece 9 of channel shaped cross-section.

The bridge-piece 9 is provided with a connector 10 for attaching the wiper to the end of a wiper arm 11. The connector comprises a channel-shaped body part 20, conveniently formed of sheet metal, having a down-turned end 21, the free end of which is reduced in width to form a tongue portion 22 adapted to pass through a transverse slot 23 formed in the back of the bridge-piece 9 with the shoulders 25 at the base of the tongue resting on the top edges of the side walls of the bridge-piece at opposite ends of the slot 23 to form a kind of knife-edge bearing extending transversely of the wiper. In the portion of the tongue 22 which projects through the slot 23 is formed an opening 26 through which is inserted a retainer comprising a leaf spring 27 of which opposite ends of the spring bear on the underside of the back wall of the bridge-piece so as to press the shoulders 25 into contact with the side walls at the ends of the slot 23. The leaf spring 27 is retained within the opening 26 by forming it with a transverse recess 28 in its central region which interlocks with the bottom edge of the opening 26.

Fitted within the channel of the body part 20 is a leaf spring 29 which is shaped as shown in FIGURE 3 with a downturned end 30 which lies against the down-turned end 21 of the body 20 and extends as a tongue, together with the tongue portion 22, through the transverse slot 23, the portion of the down-turned end 30 which projects through the slot having an opening 31 aligned with the opening 26 in the tongue 22 so that the retainer leaf spring 27 can pass through both openings 26 and 31 and thereby hold both the body part 20 and the leaf spring 29 assembled together and to the bridge-piece 9. The leaf spring 29 bears against the base of the channel of the body part 20 at its inner end and is then stepped away from the base of the channel as indicated at 32 so that between the free end of the leaf spring and the channel is formed a passage to receive the flat strip portion forming the end of the wiper arm 11. Fingers 33 folded over from the channel edges of the body part 20 urge the free end of the leaf spring towards the base of the channel. Two fingers 34 are struck up from the edges of the leaf spring 29 to form shoulders or detents adapted to engage with the shoulders formed by the notches 35 adjacent the end of the wiper arm 11 when the latter is inserted into the connector, and thus prevent the wiper arm from being withdrawn from the connector. The free end of the leaf spring at the open end of the passage is provided with a finger actuating portion 36, slightly down-turned, so that the spring 29 may be flexed downwardly to disengage the fingers 34 from the shoulders at the ends of the notches 35 when it is desired to detach the connector and wiper blade from the wiper arm.

In addition to the side notches 35, the wiper arm end, which is made of flat strip stainless steel of substantially rectangular cross-section, is provided with a projection 40 on its upper surface. Projection 40 is preferably formed by punching up the material of the arm end to form an embossed dimple, thereby producing a corresponding cavity 41 on the undersurface of the arm end. The dimple 40 is disposed on the central longitudinal axis of the arm end and slightly nearer the end of the arm than the notches 35. When the arm end is inserted fully into the connector 10 with the fingers 34 engaging the notches 35, the projection 40 enters an aperture 42 in the wall of the connector body part 20 opposite to the spring 29, and is urged therein by the pressure of the leaf spring 29 pressing against the undersurface of the wiper arm end (see FIG. 3). The aperture 42 is shown as a closed slot extending longitudinally of the connector and is so positioned that the projection 40, when the arm is fully inserted into the connector as shown in FIG. 3, is spaced from the end 42a of the slot which lies nearest the open end of the connector into which the arm is inserted.

Thus, when the leaf spring 29 is flexed downwardly to disengage the fingers 34, the arm 11 can be withdrawn until the projection 40 engages the end 42a of the slot 42 (as shown in FIG. 4) in which position, if the spring 29 is released, the fingers 34 will rest on the undersurface of the arm end, the arm being retained in the connector only by the projection 40 and end 42a which provide a second or auxiliary set of cooperating shoulders. To disengage these shoulders the arm end must be moved, against the action of the leaf spring 29, away from the base of the channel of the body part 20. The arm may then be completely withdrawn from the connector.

During insertion of the wiper arm in the connector, the leaf spring 29 flexes away from the base of the channel of the body part, and the passage formed by the channel of the connector body part and the leaf spring snugly and resiliently embraces the end of the wiper arm, the fingers 33, when the arm is fully inserted, restraining any appreciable rocking of the connector body about the longitudinal axis of the end portion of the wiper arm.

Fingers 37 folded over from the channel edges of the body part 20 at the open end of the connector, and spaced from the leaf spring 29, provide stops for limiting the extent to which the leaf spring 29 can be flexed and thereby prevents it from breaking in normal use.

The connector above described has the additional advantage that a wiper blade fitted therewith can be connected not only to a wiper arm having its end constructed as herein described, but also to an arm end having only notches 35 or only a projection 40, both of which arm end constructions are already in extensive use. In such cases, of course, only a single locking connection will be effected between the arm and the connector, instead of the double lock achieved with the particular arm construction herein described.

Further, the arm end construction herein described has the additional advantage that it can connect with a blade fitted with a connector designed for attachment to a wiper arm provided with only side notches, and also to a blade fitted with a connector intended to receive an arm which is provided only with a projection or dimple 40.

I claim:

1. A windscreen wiper comprising a wiper arm and a wiper blade having a pressure distributing backing, the outer end of the arm comprising a flat, substantially rectangular, strip portion which slides longitudinally into a correspondingly shaped passage in a connector on the blade backing and being provided with a notch at least one side edge thereof adapted to be engaged by detent means struck up at at least one side of a leaf spring incorporated in the connector, and wherein the outer end of the arm is also provided with a projection on one surface thereof which is adapted to enter an aperture in the wall of the connector opposite the spring when said detent means engage said at least one notch, and is urged into said aperture by the spring, said aperture being in the form of a closed slot extending in the longitudinal direction of the connector passage and towards the open end of the passage from the position occupied by the projection therein when the arm is secured in the connector by said detent means engaging with said at least one notch.

2. For a windscreen wiper as claimed in claim 1, a wiper blade having a wiper arm connector pivotally attached to the blade backing so as to pivot about an axis transverse to the longitudinal direction of the blade, said connector having a passage extending generally in the longitudinal direction of the blade and having a cross-section adapted to receive the end of a wiper arm which is constituted by a flat strip portion of substantially rectangular cross-section, one wall of said passage being constituted by a leaf spring adapted to press against a flat face of the wiper arm end and having a detent struck up at at least one edge thereof, and the opposing wall of the passage having an aperture therein, said aperture being in the form of a closed slot extending in the longitudinal direction of the connector passage.

References Cited
UNITED STATES PATENTS

| | | | |
|---|---|---|---|
| 2,915,770 | 12/1959 | Scinta | 15—250.32 |
| 3,049,743 | 8/1962 | Graczyk et al. | 15—250.32 |
| 3,133,304 | 5/1964 | Reese | 15—250.32 |
| 3,135,983 | 6/1964 | O'Shei | 15—250.32 |

CHARLES A. WILLMUTH, *Primary Examiner.*